(12) United States Patent
Le et al.

(10) Patent No.: US 7,051,177 B2
(45) Date of Patent: May 23, 2006

(54) METHOD FOR MEASURING MEMORY LATENCY IN A HIERARCHICAL MEMORY SYSTEM

(75) Inventors: Hung Qui Le, Austin, TX (US); Alexander Erik Mericas, Austin, TX (US); Robert Dominick Mirabella, Round Rock, TX (US); Toshihiko Kurihara, Kanagawa-ken (JP); Michitaka Okuno, Nagano (JP); Masahiro Tokoro, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/210,359

(22) Filed: Jul. 31, 2002

(65) Prior Publication Data

US 2004/0024982 A1 Feb. 5, 2004

(51) Int. Cl.
*G06F 12/00* (2006.01)
*G06F 12/14* (2006.01)
*G06F 12/16* (2006.01)
*G06F 13/00* (2006.01)
*G06F 13/28* (2006.01)

(52) U.S. Cl. ............. 711/167; 711/113; 711/137; 711/202; 710/100; 710/260; 712/200; 712/216; 712/219; 712/227

(58) Field of Classification Search ............. 711/113, 711/137, 167, 202; 710/100, 260; 712/200, 712/216, 219, 227
See application file for complete search history.

(56) References Cited

U.S. PATENT DOCUMENTS

| | | | | |
|---|---|---|---|---|
| 5,664,193 A | * | 9/1997 | Tirumalai | ............. 717/153 |
| 5,964,867 A | * | 10/1999 | Anderson et al. | ......... 712/219 |
| 2002/0087811 A1 | * | 7/2002 | Khare et al. | ............. 711/146 |
| 2003/0005252 A1 | * | 1/2003 | Wilson et al. | ............. 711/167 |

OTHER PUBLICATIONS

Singhal et al, Apr. 18–21, 1994, IEEE, pp. 48–59.*

* cited by examiner

*Primary Examiner*—Donald Sparks
*Assistant Examiner*—Bao Q Truong
(74) *Attorney, Agent, or Firm*—Mark E. McBurney; Dillon & Yudell LLP

(57) ABSTRACT

A method for determining the latency for a particular level of memory within a hierarchical memory system is disclosed. A performance monitor counter is allocated to count the number of loads (load counter) and for counting the number of cycles (cycle counter). The method begins with a processor determining which load to select for measurement. In response to the determination, the cycle counter value is stored in a rewind register. The processor issues the load and begins counting cycles. In response to the load completing, the level of memory for the load is determined. If the load was executed from the desired memory level, the load counter is incremented. Otherwise, the cycle counter is rewound to its previous value.

12 Claims, 4 Drawing Sheets

METHOD FOR MEASURING MEMORY LATENCY IN A HIERARCHICAL MEMORY SYSTEM

BACKGROUND OF THE INVENTION

The present invention is related to the subject matter of the following commonly assigned, copending U.S. patent applications: Ser. No. 10/210,357 entitled "SPECULATIVE COUNTING OF PERFORMANCE EVENTS WITH REWIND COUNTER" and filed Jul. 31, 2002. The content of the above-referenced applications is incorporated herein by reference.

1. Technical Field

This invention relates to performance monitoring for a microprocessor, more particularly, to monitoring memory latency, and still more particularly to monitoring memory latency for a microprocessor having a hierarchical memory system.

2. Description of the Related Art

Processors often contain several levels of memory for performance and cost reasons. Generally, memory levels closest to the processor are small and fast, while memory farther from the processor is larger and slower. The level of memory closest to the processor is the Level 1 (L1) cache, which provides a limited amount of high speed memory. The next closest level of memory to the processor is the Level 2 (L2) cache. The L2 caches is generally larger than the L1 cache, but takes longer to access than the L1 cache. The system main memory is the level of memory farthest from the processor. Accessing main memory consumes considerably more time than accessing lower levels of memory.

When a processor requests data from a memory address, the L1 cache is examined for the data. If the data is present, it is returned to the processor. Otherwise, the L2 cache is queried for the requested memory data. If the data is not present, the L2 cache acquires the requested memory address data from the system main memory. As data passes from main memory to each lower level of memory, the data is stored to permit more rapid access on subsequent requests.

Additionally, many modem microprocessors include a Performance Monitor Unit (PMU). The PMU contains one ore more counters (PMCs) that accumulate the occurrence of internal events that impact or are related to the performance of a microprocessor. For example, a PMU may monitor processor cycles, instructions completed, or delay cycles executing a load from memory. These statistics are useful in optimizing the architecture of a microprocessor and the instructions executed by a microprocessor.

While a PMU may accumulate the number of delay cycles executing a load in a PMC, this value is not always useful as the count does not indicate how much each level of memory contributed to the count. Performance engineers are often interested in the contributions to the load delay by each level of memory. Currently, there is no method of crisply, or accurately counting, the number of delay cycles attributable to a particular level of memory in a hierarchical memory system.

The method currently used to determine delay cycles while accessing a particular level of memory involves setting a threshold value. As a processor is required to search memory levels farther away, the number of delay cycles increases noticeably. If the number of delay cycles versus level of memory were plotted, there would be sharp rises in the delay cycles for each level of memory moving away from the processor. Accordingly, the present method of determining delay cycles for a particular level of memory sets a threshold value depending on the level of memory to be measured.

Typically, the system main memory is first measured with a large threshold value since accesses to main memory take longer. If a load delay exceeds the threshold, then the delay is attributed to main memory. Having a delay cycle count for main memory, the next lower level of memory (assume L2) is measured. The threshold is set accordingly and all delays exceeding the threshold are counted. The count also includes delays from accessing main memory; however, since the number of delay cycles for main memory is already approximately known, the delay cycles for L2 is obtained by subtracting the delays cycle count for main memory from the count obtained using the threshold for L2. The process is repeated for each lower level of memory.

The problem with using a threshold to measure memory latency in a hierarchical memory system is that it does not accurately determine the delay for each level of memory and requires several passes to determine the delay cycle counts for lower levels of memory. A memory access to a lower level of memory may exceed the threshold for a higher level of memory under certain circumstances which would result in the delay being attributed to the incorrect level of memory.

Therefore, there is a need for a new and improved method for accurately counting the number of delay cycles attributable to a particular level of memory in a hierarchical memory system.

SUMMARY OF THE INVENTION

As will be seen, the foregoing invention satisfies the foregoing needs and accomplishes additional objectives. Briefly described, the present invention provides an improved method for counting the number of delay cycles attributable to a particular level of memory within a hierarchical memory system.

According to one aspect of the present invention, a method for counting the number of delay cycles attributable to a particular level of memory within a hierarchical memory system is described. A performance monitor counter is allocated to count the number of loads (load counter) and for counting the number of cycles (cycle counter). The system and method begin with a processor determining which load to select for measurement. In response to the determination, the cycle counter value is stored in a rewind register. The processor issues the load and begins counting cycles. In response to the load completing, the level of memory for the load is determined. If the load was executed from the desired memory level, the load counter is incremented. Otherwise, the cycle counter is rewound to its previous value.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
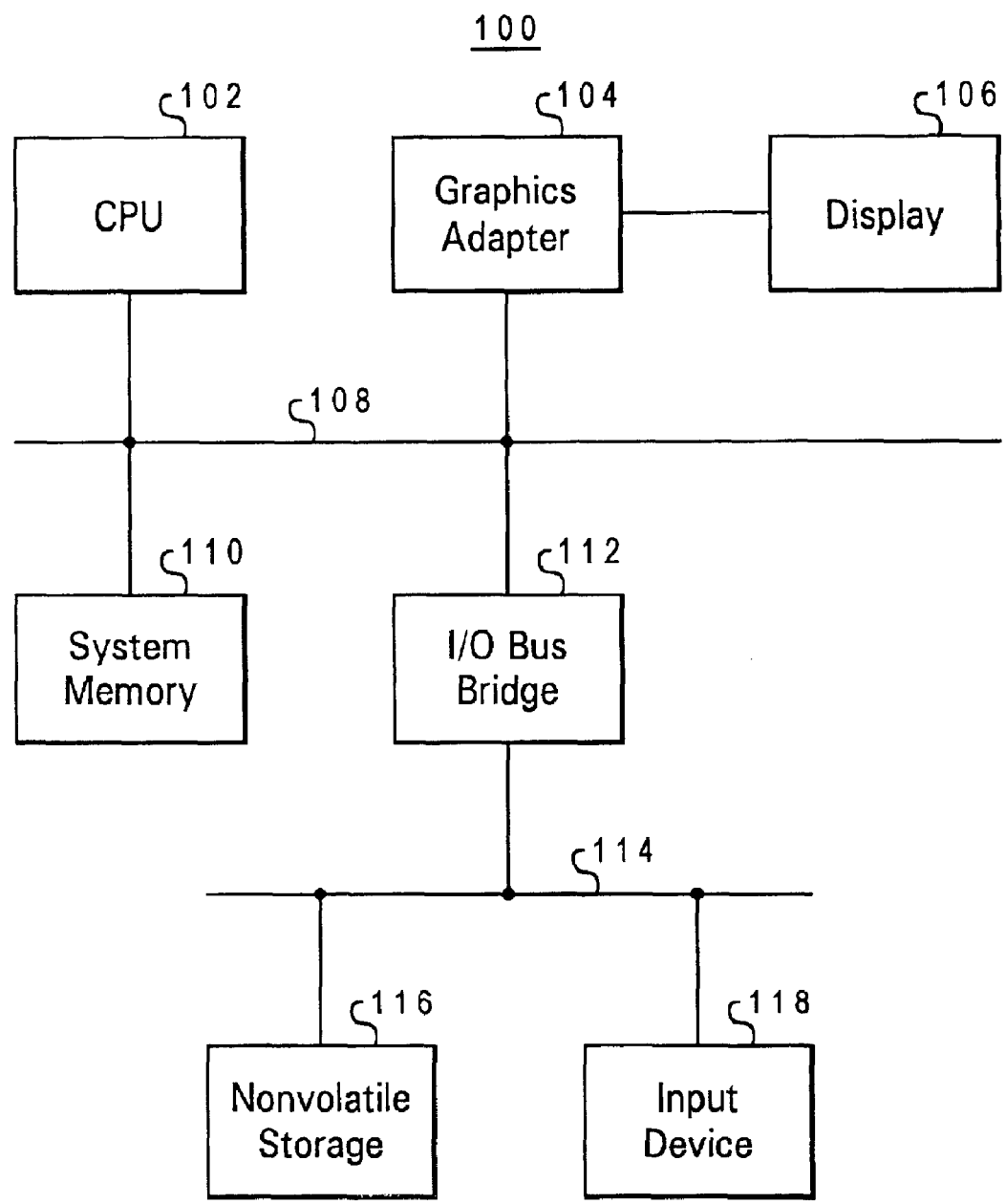
FIG. 1 is a block diagram of an exemplary computer system used in the present invention.

Referring now to the drawing figures, in which like numerals indicate like elements or steps throughout the several views, the preferred embodiment of the present invention will be described. In general, the present invention provides for counting the number of delay cycles attributable to a particular level of memory within a hierarchical memory system.

With reference now to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

The CPU 102 described in FIG. 1 is preferably a microprocessor such as the POWER4™ chip manufactured by International Business Machines, Inc. of Armonk, N.Y.

Figure 2:
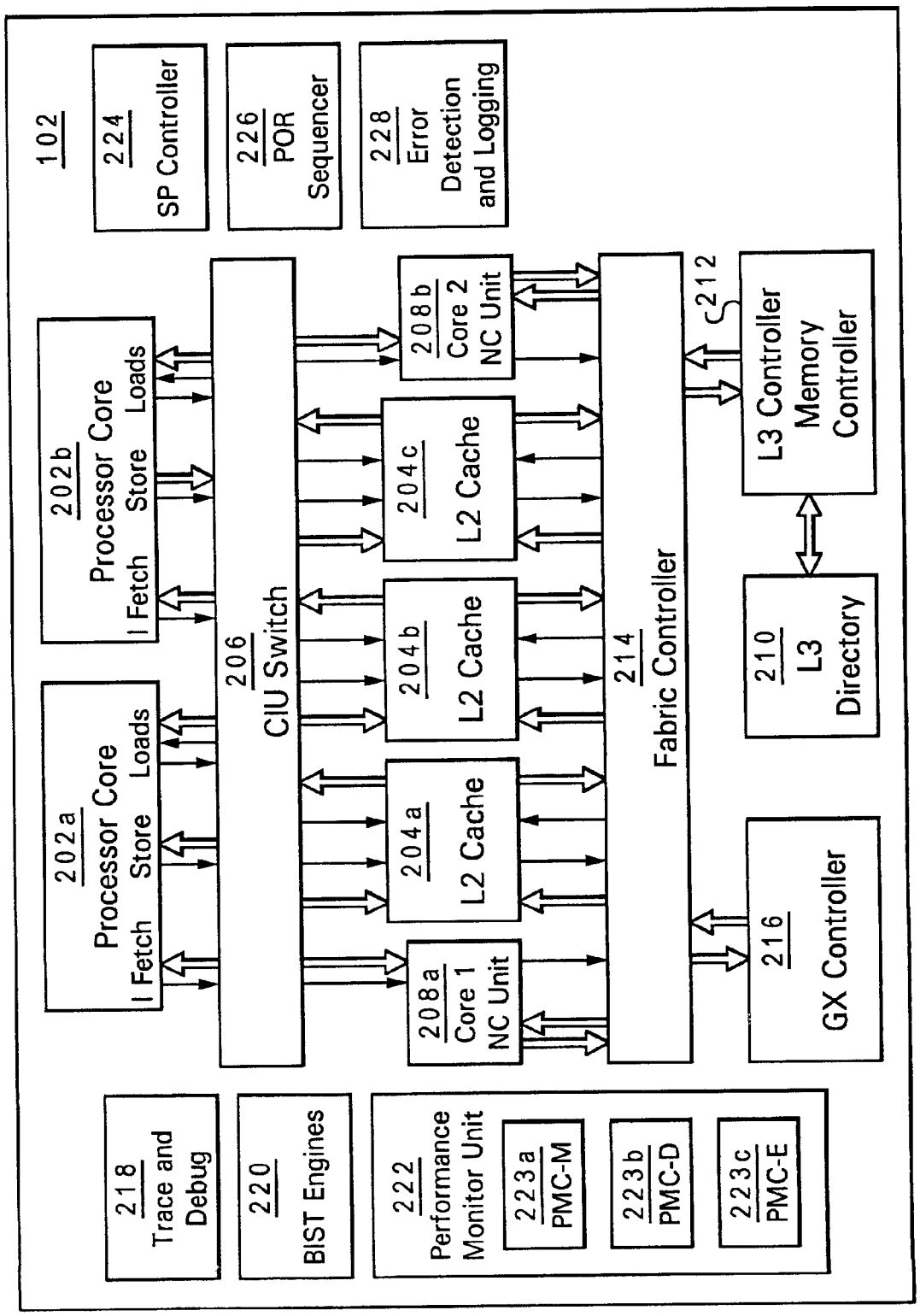
FIG. 2 depicts an exemplary processor used with the present invention.

With reference now to FIG. 2, such an exemplary microprocessor is depicted as CPU 102. In the preferred embodiment, at least two processor cores 202a and 202b are included in CPU 102. Processor cores 202 share a unified second-level cache system depicted as L2 caches 204a–204c, through a core interface unit (CIU) 206. CIU 206 is a crossbar switch between the L2 caches 204a–204c, each implemented as a separate, autonomous cache controller, and the two CPU's 202. Each L2 cache 204 can operate concurrently and feed multiple bytes of data per cycle. CIU 206 connects each of the three L2 caches 204 to either an L1 data cache (shown as D-cache 312 in FIG. 3) or an L1 instruction cache (shown as I-cache 320 in FIG. 3) in either of the two CPU's 102. Additionally, CIU 206 accepts stores from CPU 102 across multiple-byte-wide buses and sequences them to the L2 caches 204. Each CPU 102 has associated with it a noncacheable (NC) unit 208, responsible for handling instruction-serializing functions and performing any noncacheable operations in the storage hierarchy. Logically, NC unit 208 is part of L2 cache 204.

An L3 directory 210 for a third-level cache, L3 (not shown), and an associated L3 controller 212 are also part of CPU 102. The actual L3 may be onboard CPU 102 or on a separate chip. A separate functional unit, referred to as a fabric controller 214, is responsible for controlling dataflow between the L2 cache, including L2 cache 204 and NC unit 208, and L3 controller 212. Fabric controller 214 also controls input/output (I/O) dataflow to other CPUs 102 and other I/O devices (not shown). For example, a GX controller 216 can control a flow of information into and out of CPU 102, either through a connection to another CPU 102 or to an I/O device.

As depicted, PMU 222 includes performance monitor counters (PMC) 223a–c. PMCs 223a–c may be allocated to count various events related to CPU 102. For example, PMCs 223a–c may be utilized in determining cycles per instruction (CPI), load delay, execution delay, and data dependency delay. In the present invention, PMC 223a–c are utilized to maintain counts of the number of loads and the number of delay cycles attributable to a particular memory level Also included within CPU 102 are functions logically called pervasive functions. These include a trace and debug facility 218 used for first-failure data capture, a built-in self-test (BIST) engine 220, a performance-monitoring unit (PMU) 222, a service processor (SP) controller 224 used to interface with a service processor (not shown) to control the overall data processing system 100 shown in FIG. 1, a power-on reset (POR) sequencer 226 for sequencing logic, and an error detection and logging circuitry 228.

Figure 3:
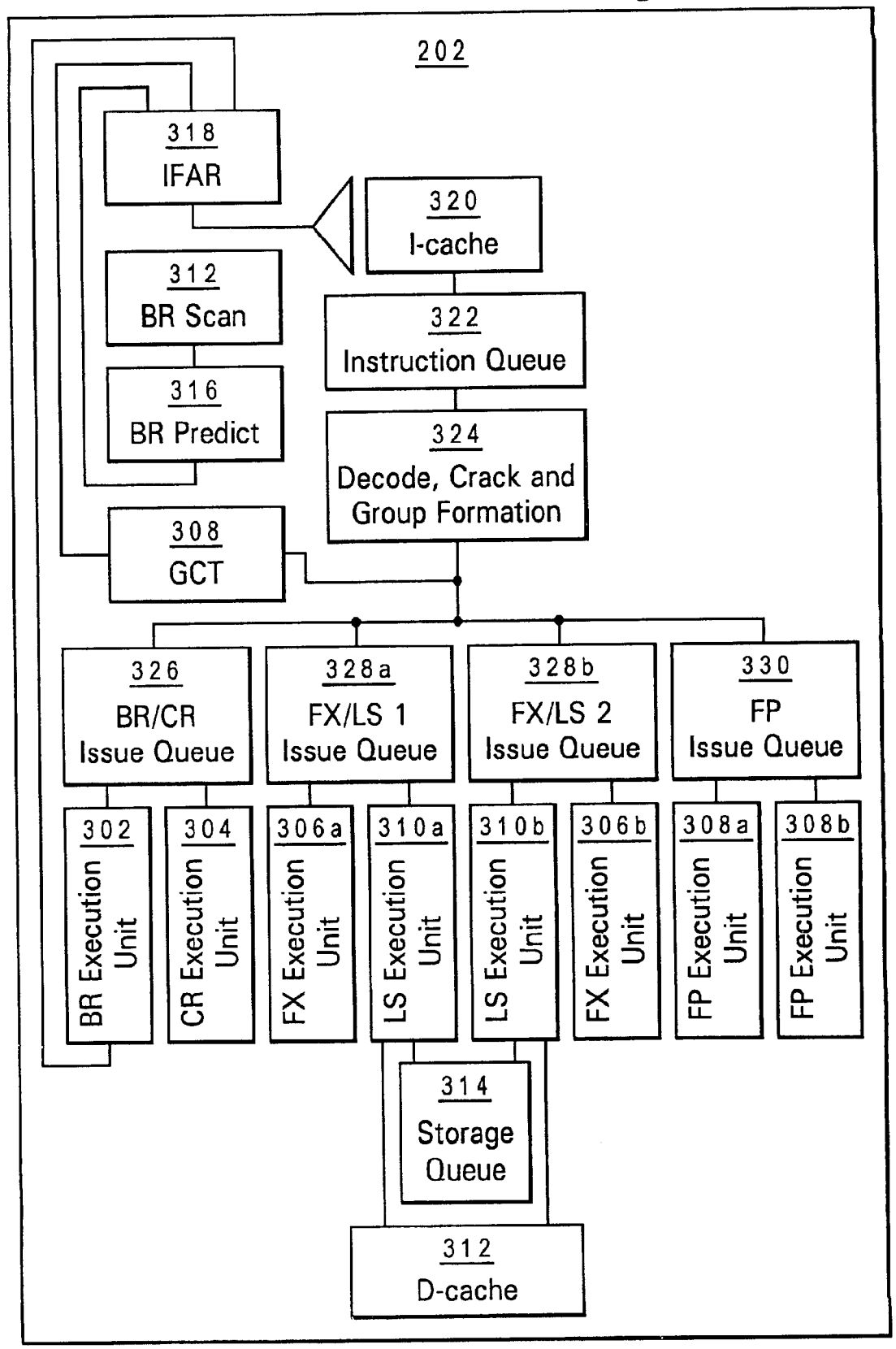
FIG. 3 illustrates an exemplary processor core used with the present invention.

With reference now to FIG. 3, there is depicted a high-level block diagram of processor core 202 depicted in FIG. 2. The two processor cores 202 shown in FIG. 2 are on a single chip and are identical, providing a two-way Symmetric Multiprocessing (SMP) model to software. Under the SMP model, ether idle processor core 202 can be assigned any task, and additional CPUs 102 can be added to improve performance and handle increased loads.

The internal microarchitecture of processor core 202 is preferably a speculative superscalar out-of-order execution design. In the exemplary configuration depicted in FIG. 3, multiple instructions can be issued each cycle, with one instruction being executed each cycle in each of a branch (BR) execution unit 302, a condition register (CR) execution unit 304 for executing CR modifying instructions, fixed point (FX) execution units 306a and 306b for executing fixed-point instructions, load-store execution units (LSU) 310a and 310b for executing load and store instructions, and floating-point (FP) execution units 308a and 308b for executing floating-point instructions. LSU's 310, each capable of performing address-generation arithmetic, work with data cache (D-cache) 312 and storage queue 314 to provide data to FP execution units 308.

A branch-prediction scan logic (BR scan) 312 scans fetched instructions located in Instruction-cache (I-cache) 320, looking for multiple branches each cycle. Depending upon the branch type found, a branch-prediction mechanism denoted as BR predict 316 is engaged to help predict the branch direction or the target address of the branch or both. That is, for conditional branches, the branch direction is predicted, and for unconditional branches, the target address is predicted. Branch instructions flow through an Instruction-fetch address register (IFAR) 318, and I-cache 320, an instruction queue 322, a decode, crack and group (DCG) unit 324 and a branch/condition register (BR/CR) issue queue 326 until the branch instruction ultimately reaches and is executed in BR execution unit 302, where actual outcomes of the branches are determined. At that point, if the predictions were found to be correct, the branch instructions are simply completed like all other instructions. If a prediction is found to be incorrect, the instruction-fetch logic, including BR scan 312 and BR predict 316, causes the mispredicted instructions to be discarded and begins refetching instructions along the corrected path.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, then I-cache 320 is accessed and retrieves multiple instructions per cycle. The I-cache 320 is accessed using an I-cache directory (IDIR) (not shown), which is indexed by the effective address of the instruction to provide required real addresses. On an I-cache 320 cache miss, instructions are returned from the L2 cache 204 illustrated in FIG. 2.

Figure 4:
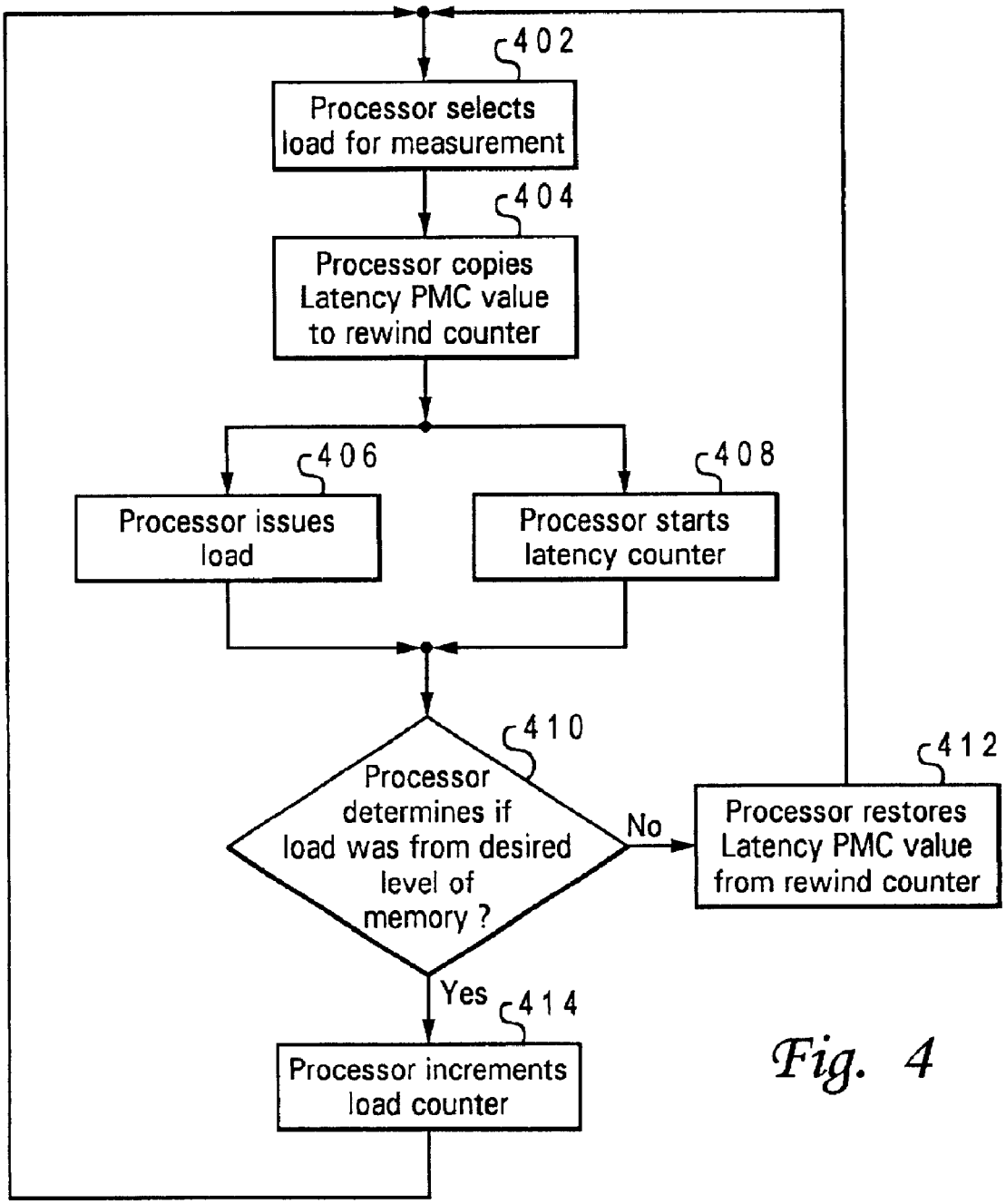
FIG. 4 is a flow chart depicting one possible set of steps taken to carry out the present invention, allowing for the number of delay cycles for a particular level of memory in a hierarchical memory system to be determined.

With reference now to FIG. 4, a flow chart of one possible set of steps to carry out the present invention is depicted. Prior to the execution of the steps in FIG. 4, a performance monitor count is allocated to count latency cycles for a predetermined level of the memory hierarchy (latency counter). A second performance monitor counter is allocated to count the total number of loads from the predetermined level (load counter).

As illustrated at step 402, a processor selects a load instruction for measurement. The method of selecting the load instruction may be by any number of means known in the art such as random selection based on position in an internal queue, or filtering of instructions based on some characteristic of the instruction. After the processor selects a load for measurement, the processor causes the latency count value to be copies to a rewind register as depicted at step 404.

Once the value of the latency counter is preserved in the rewind register, the processor is ready to issue the load as illustrated at step 406. While the processor is executing the load, the processor is incrementing the latency counter each cycle as depicted at step 408. After the load has completed, the storage system returns an indicator specifying which level of the hierarchy the load was satisfied from. The processor is able to determine if the load was satisfied from the predetermined level of memory as illustrated at step 410.

If the load was not satisfied from the predetermined level of memory, the processor restores the latency counter value from the rewind counter as depicted at step 412. By restoring the latency counter to the rewind counter value, the latency counter value discards the latency cycles attributed to loads from levels other than the predetermined level of memory.

If the load was satisfied from the predetermined level of memory, the processor increments the load counter as illustrated at step 414. The processor doe snot need to rewind the latency counter as the cycles accumulated were attributable to the predetermined level of memory.

Those skilled in the art will readily appreciate that the method of the present invention may be carried out in different manners. For example, instead of using a rewind counter, the processor could accumulate the number of latency cycles for the current load in a separate counter. Once the load completed, the separate counter could be added to the latency counter if the load was satisfied from the predetermined level of memory.

The present invention has been described in relation to particular embodiments which are intended in all respects to be illustrative rather than restrictive. Alternative embodiments will become apparent to those skilled in the art to which the present invention pertains without departing from its spirit and scope. For example, while the present invention has been described in terms of a processor with two processor cores, the present invention has use in processors of any number or processor cores. Accordingly, the scope of the present invention is defined by the appended claims rather than the foregoing discussion.

What is claimed is:

1. A method for determining the latency of a desired level of memory within a hierarchical memory system, said method comprising the steps of:

issuing a load from a computer microprocessor to a hierarchical memory system including a plurality of levels;

incrementing a latency counter during performance of said load;

receiving a response to said load;

determining if said response to said load was issued from a desired level from among said plurality of levels of said hierarchical memory system;

in response to determining that said response to said load was issued from said desired level of said hierarchical memory system, recording a latency value of said latency counter in a secondary storage location; and in response to determining that said response to said load was not issued from said desired level of said hierarchical memory system, discarding said latency value of said latency counter.

2. The method of claim 1, wherein:

said step of recording further comprises storing a present value of said latency counter in a rewind counter prior to issuing a subsequent load; and resetting said present value of said latency counter with said stored value from said rewind counter in response to determining said subsequent load was not satisfied from said desired level of memory.

3. The method as described in claim 1, wherein the step of incrementing said latency counter comprises the step of adding a latency of said load to a latency value of a previous load in an accumulator.

4. The method as described in claim 1, wherein said incrementing step further comprises incrementing a performance monitor counter.

5. A system for determining the latency of a desired level of memory within a hierarchical memory system, said system comprising:

means for, responsive to issuance of a load from a computer microprocessor to a hierarchical memory system including a plurality of levels, incrementing a latency counter during performance of a load;

means, in response to receiving a response to said load, for determining if said response to said load was issued from a desired level from among said plurality of levels of said hierarchical memory system;

means, responsive to determining that said response to said load was issued from said desired level of said hierarchical memory system, for recording a latency value from said latency counter in a secondary storage location; and means, responsive to determining that said response to said load was not issued from said desired level of said hierarchical memory system, for discarding said latency value of said latency counter.

6. The system as described by claim 5, wherein:

said means for recording further comprises means for storing a present value of said latency counter in a rewind counter prior to issuing a subsequent load; and means for resetting said present value of said latency counter with said stored value from said rewind counter in response to determining said subsequent load was not satisfied from said desired level of memory.

7. The system of claim 5, said means for incrementing further comprising means for adding said latency value of said load to latency value of a previous load in an accumulator.

8. The system as described in claim 5, wherein said latency counter is a performance monitor counter.

9. A method for determining the latency of a predetermined level of memory within a hierarchical memory system used with a computer microprocessor having a latency counter, said method comprising the steps of:

said computer microprocessor determining if a selected load for measurement was issued from said predetermined level of memory;

incrementing said latency counter in response to said determination;

said computer microprocessor storing a present value of said latency counter in a stored value in a rewind counter prior to issuing said load selected for measurement;

said computer microprocessor incrementing said latency counter during execution of said load selected for measurement; and said computer microprocessor resetting said present value of said latency counter with said stored value in said rewind counter in response to said computer microprocessor determining said load was not satisfied from said predetermined level of memory.

10. A system for determining the latency of a predetermined level of memory within a hierarchical memory system used with a computer microprocessor said system comprising:

means for said computer microprocessor determining if a selected load for measurement was issued from said predetermined level of memory; and a latency counter, said latency counter incrementing in response to said determination, wherein said latency counter is a rewind counter, said rewind counter storing a present value and a rewind value and wherein said present value of said rewind counter is stored as said rewind value prior to said microprocessor issuing said load selected for measurement.

11. The system as described in claim 10, wherein said present value of said rewind counter increments during execution of said load selected for measurement.

12. The system as described in claim 11, wherein said present value of said rewind counter is reset to the rewind value in response to said computer microprocessor determining said load was not satisfied from said predetermined level of memory.

* * * * *